United States Patent
Lim et al.

(10) Patent No.: US 7,680,116 B1
(45) Date of Patent: Mar. 16, 2010

(54) OPTIMIZED BUFFER LOADING FOR PACKET HEADER PROCESSING

(75) Inventors: Raymond M. Lim, Los Altos Hills, CA (US); Jeffrey G. Libby, Cupertino, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 370 days.

(21) Appl. No.: 11/691,972

(22) Filed: Mar. 27, 2007

Related U.S. Application Data

(63) Continuation of application No. 10/102,932, filed on Mar. 22, 2002, now Pat. No. 7,212,530.

(51) Int. Cl.
*H04L 12/56* (2006.01)
(52) U.S. Cl. ...................................... 370/392; 370/389
(58) Field of Classification Search .................. None
See application file for complete search history.

(56) References Cited

U.S. PATENT DOCUMENTS

| | | | |
|---|---|---|---|
| 5,608,786 A | 3/1997 | Gordon | 370/352 |
| 5,630,054 A | 5/1997 | Trang | |
| 5,826,032 A | 10/1998 | Finn et al. | |
| 5,938,736 A * | 8/1999 | Muller et al. | 709/243 |
| 6,067,300 A | 5/2000 | Baumert et al. | 370/413 |
| 6,172,981 B1 | 1/2001 | Cox et al. | |
| 6,182,267 B1 | 1/2001 | Kidd et al. | |
| 6,275,508 B1 | 8/2001 | Aggarwal et al. | |
| 6,289,023 B1 | 9/2001 | Dowling et al. | |
| 6,412,092 B1 | 6/2002 | Raghunath | |
| 6,442,669 B2 | 8/2002 | Wright et al. | 712/19 |
| 6,560,228 B2 | 5/2003 | Kingsley | |
| 6,629,141 B2 | 9/2003 | Elzur et al. | |
| 6,654,823 B2 | 11/2003 | Soejima et al. | |
| 6,671,722 B1 | 12/2003 | Stachura et al. | 709/224 |
| 6,678,746 B1 | 1/2004 | Russell et al. | |
| 6,721,316 B1 | 4/2004 | Epps et al. | 370/389 |
| 6,791,947 B2 | 9/2004 | Oskouy et al. | |
| 6,807,581 B1 | 10/2004 | Starr et al. | |
| 6,920,133 B1 | 7/2005 | Boodaghians | |
| 6,944,168 B2 | 9/2005 | Paatela et al. | |
| 6,970,468 B2 | 11/2005 | Doidge et al. | 370/395.1 |
| 6,988,235 B2 | 1/2006 | Brown | |

(Continued)

OTHER PUBLICATIONS

Co-pending U.S. Appl. No. 10/102,951, filed Mar. 22, 2002; entitled: "Systems and Methods for Handling Packet Fragmentation"; 35 page specification; 15 sheets of drawings.

(Continued)

*Primary Examiner*—Jayanti K Patel
*Assistant Examiner*—Anthony Sol
(74) *Attorney, Agent, or Firm*—Harrity & Harrity, LLP

(57) ABSTRACT

A processing engine for processing header data includes a level 2 (L2) header generation unit and a level 3 (L3) header generation unit. The L2 and L3 header generation units are implemented in parallel with one another. The L2 generation unit writes L2 header information to a first buffer and the L3 generation unit writes L3 header information to a second buffer. When the L2 and L3 header generation units finish processing a data unit, the data unit may be unloaded from the first and second buffer while a new data unit is simultaneously loaded to the header processing engine.

17 Claims, 15 Drawing Sheets

U.S. PATENT DOCUMENTS

| | | | |
|---|---|---|---|
| 6,996,105 | B1 | 2/2006 | Wilson |
| 7,012,890 | B2 | 3/2006 | Yazaki et al. |
| 7,158,520 | B1 | 1/2007 | Sindhu et al. |
| 7,180,893 | B1 | 2/2007 | Sindhu et al. |
| 7,212,530 | B1 | 5/2007 | Lim et al. |
| 7,215,662 | B1 | 5/2007 | Lim et al. |
| 7,236,501 | B1 | 6/2007 | Lim et al. |
| 7,239,630 | B1 | 7/2007 | Lim et al. |
| 7,283,528 | B1 | 10/2007 | Lim et al. |
| 2002/0016905 | A1 | 2/2002 | Kojima et al. .................. 712/36 |
| 2002/0064130 | A1 | 5/2002 | Siu et al. |
| 2002/0116595 | A1 | 8/2002 | Morton ........................ 712/22 |
| 2002/0138646 | A1* | 9/2002 | Tsuboi et al. ................ 709/238 |
| 2002/0163916 | A1 | 11/2002 | Oskouy et al. |
| 2003/0002438 | A1 | 1/2003 | Yazaki et al. |
| 2003/0018794 | A1 | 1/2003 | Zhang et al. ................. 709/231 |
| 2003/0076850 | A1 | 4/2003 | Jason, Jr. .................... 370/414 |
| 2003/0097481 | A1 | 5/2003 | Richter |
| 2003/0156581 | A1 | 8/2003 | Osborne |
| 2003/0172177 | A1 | 9/2003 | Kersley et al. ............... 709/236 |
| 2003/0182614 | A1 | 9/2003 | Schroeder |
| 2004/0085962 | A1 | 5/2004 | Sugai et al. ................. 370/392 |
| 2004/0228339 | A1 | 11/2004 | Gallo et al. ................. 370/379 |
| 2004/0264505 | A1* | 12/2004 | Miki et al. .................. 370/469 |

OTHER PUBLICATIONS

Co-pending U.S. Appl. No. 10/102,931, filed Mar. 22, 2002; entitled: "Dedicated Processing Resources for Packet Header Generation"; 44 page specification; 15 sheets of drawings.

Co-pending U.S. Appl. No. 10/102,933, filed Mar. 22, 2002; entitled: "Logical Separation and Accessing of Descriptor Memories"; 36 page specification; 15 sheet of drawings.

Co-pending U.S. Appl. No. 10/102,958, filed Mar. 22, 2002; entitled: "On the Fly Header Checksum Processing Using Dedicated Logic"; 35 page specification; 15 sheets of drawings.

U.S. Appl. No. 11/751,952, filed May 22, 2007, 50 pages.
U.S. Appl. No. 11/695,723, filed Apr. 3, 2007, 51 pages.
U.S. Appl. No. 11/853,356, filed Sep. 11, 2007, 50 pages.

* cited by examiner

OPTIMIZED BUFFER LOADING FOR PACKET HEADER PROCESSING

RELATED APPLICATIONS

This application is a continuation of U.S. patent application Ser. No. 10/102,932 filed Mar. 22, 2002, which is incorporated herein by reference.

BACKGROUND OF THE INVENTION

1. Field of the Invention

The principles of the invention relate generally to high performance network routers, and more particularly, to the processing of network information in a high performance router.

2. Description of Related Art

Routers receive data on a physical media, such as optical fiber, analyze the data to determine its destination, and output the data on a physical media in accordance with the destination. Routers were initially designed using a general purpose processor executing large software programs. As line rates and traffic volume increased, however, general purpose processors could not scale to meet these new demands. For example, as functionality was added to the software, such as accounting and policing functionality, these routers suffered performance degradation. In some instances, the routers failed to handle traffic at line rate when the new functionality was turned on.

To meet the new demands, purpose-built routers were designed with components optimized for routing. They not only handle higher line rates and higher network traffic volume, they also add functionality without compromising line rate performance.

A purpose-built router may include a number of input and output ports from which it transmits and receives information packets. A packet received at one port is directed to its appropriate output port based on an examination and processing of the packet's header information, which includes an indication of the packet's destination. A high-performance router must accordingly examine and process the header information at a high speed.

Thus, it is desirable to improve the speed and efficiency of packet header processing in high-performance routers.

SUMMARY OF THE INVENTION

Systems and methods consistent with the principles of the invention, among other things, provide for an improved packet header processing engine.

One aspect consistent with the invention is directed to a packet header processing engine. The packet header processing engine including an input memory configured to store incoming packet header information, a first packet processing unit, and a build component. The first packet processing unit generates packet header information relating to a packet header protocol of the packet by operating on the packet header information stored in the input memory. A build component receives the generated packet header information from the first and second output buffers while the input memory stores incoming packet header information for a next packet.

Another aspect consistent with the invention is directed to a method that includes receiving packet header information for a packet. The method additionally generates protocol information for the packet based on the received packet header information. Further, the method includes receiving the protocol information simultaneously with the receiving packet header information for the packet.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents of the claim limitations.

As described herein, a processing engine generates various portions of a packet header using multiple processing engines implemented in parallel and coupled to parallel output buffers. To increase efficiency, packet header data for one packet is unloaded from the output buffers while packet header data from a succeeding packet is loaded into the processing engine.

System Configuration

Figure 1:
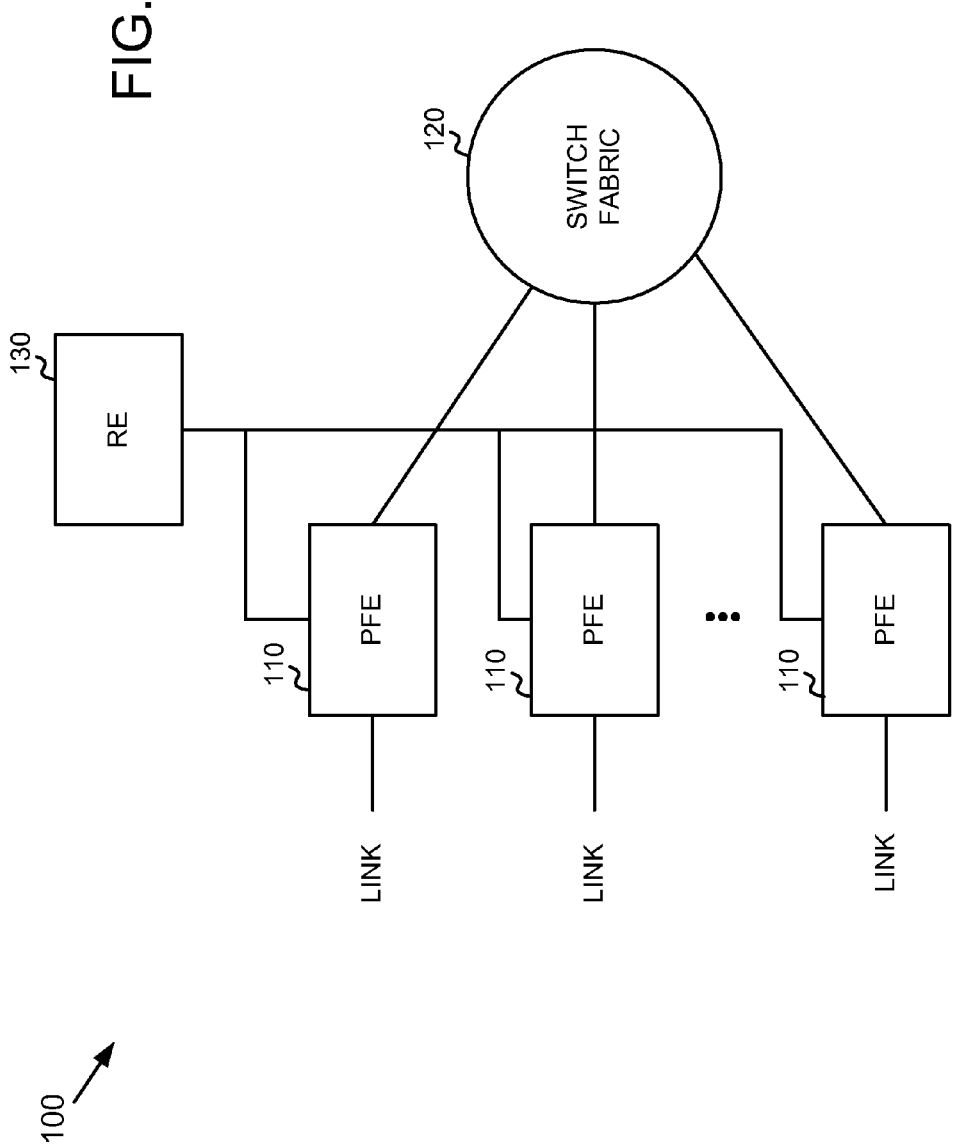
FIG. 1 is a block diagram illustrating an exemplary routing system in which principles consistent with the invention may be implemented.

FIG. 1 is a block diagram illustrating an exemplary routing system 100 in which the present invention may be implemented. System 100 receives a data stream from a physical link, processes the data stream to determine destination information, and transmits the data stream out on a link in accordance with the destination information. System 100 may include packet forwarding engines (PFEs) 110, a switch fabric 120, and a routing engine (RE) 130.

RE 130 performs high level management functions for system 100. For example, RE 130 communicates with other networks and systems connected to system 100 to exchange information regarding network topology. RE 130 creates routing tables based on network topology information, creates forwarding tables based on the routing tables, and forwards the forwarding tables to PFEs 110. PFEs 110 use the forwarding tables to perform route lookup for incoming packets. RE 130 also performs other general control and monitoring functions for system 100.

PFEs 110 are each connected to RE 130 and switch fabric 120. PFEs 110 receive data at ports on physical links connected to a network, such as a wide area network (WAN), a local area network (LAN), or a device. Each physical link could be one of many types of transport media, such as optical fiber or Ethernet cable. The data on the physical link is formatted according to one of several protocols, such as the synchronous optical network (SONET) standard or Ethernet.

PFE 110 processes incoming data by stripping off the data link layer. PFE 110 converts header information from the remaining data into data structures referred to herein as "notifications" and "cells" (where a cell is a fixed length data unit). For example, in one embodiment, the data remaining after the data link layer is stripped off is packet data. PFE 110 includes the layer 2 (L2) and layer 3 (L3) packet header information, some control information regarding the packets, and the packet data in a series of cells called "D" cells. In one embodiment, the L2, L3, and the control information are stored in the first two cells of the series of cells.

In general, L2 header information refers to header information used to steer packets within LANs. L3 header information, in contrast, provides connectivity between different LANs. In this sense, the L3 header information provides more general destination information than the L2 header. An incoming packet may include both L2 and L3 header information. Router 100 may modify the packet's L2 and L3 header information before transmitting the packet to its next destination.

PFE 110 forms a notification based on the L2, L3, and control information, and performs a route lookup using the notification and the routing table from RE 130 to determine destination information. PFE 110 may also further process the notification to perform protocol-specific functions, policing, and accounting, and might even modify the notification to form a new notification.

If the determined destination indicates that the packet should be sent out on a physical link connected to PFE 110, then PFE 110 retrieves the cells for the packet, converts the notification or new notification into header information, forms a packet using the packet data from the cells and the header information, and transmits the packet from the port associated with the physical link.

If the destination indicates that the packet should be sent to another PFE via switch fabric 120, then PFE 110 retrieves the cells for the packet, modifies the first two cells with the new notification and new control information, if necessary, and sends the cells to the other PFE via switch fabric 120. Before transmitting the cells over switch fabric 120, PFE 110 appends a sequence number to each cell, which allows the receiving PFE to reconstruct the order of the transmitted cells. Additionally, the receiving PFE uses the notification to form a packet using the packet data from the cells, and sends the packet out on the port associated with the appropriate physical link of the receiving PFE.

In summary, in one embodiment, RE 130, PFEs 110, and switch fabric 120 perform routing based on packet-level processing. PFEs 110 store each packet in cells while performing a route lookup using a notification, which is based on packet header information, including L2 and L3 layer header information. A packet might be received on one PFE and go back out to the network on the same PFE, or be sent through switch fabric 120 to be sent out to the network on a different PFE.

Figure 2:
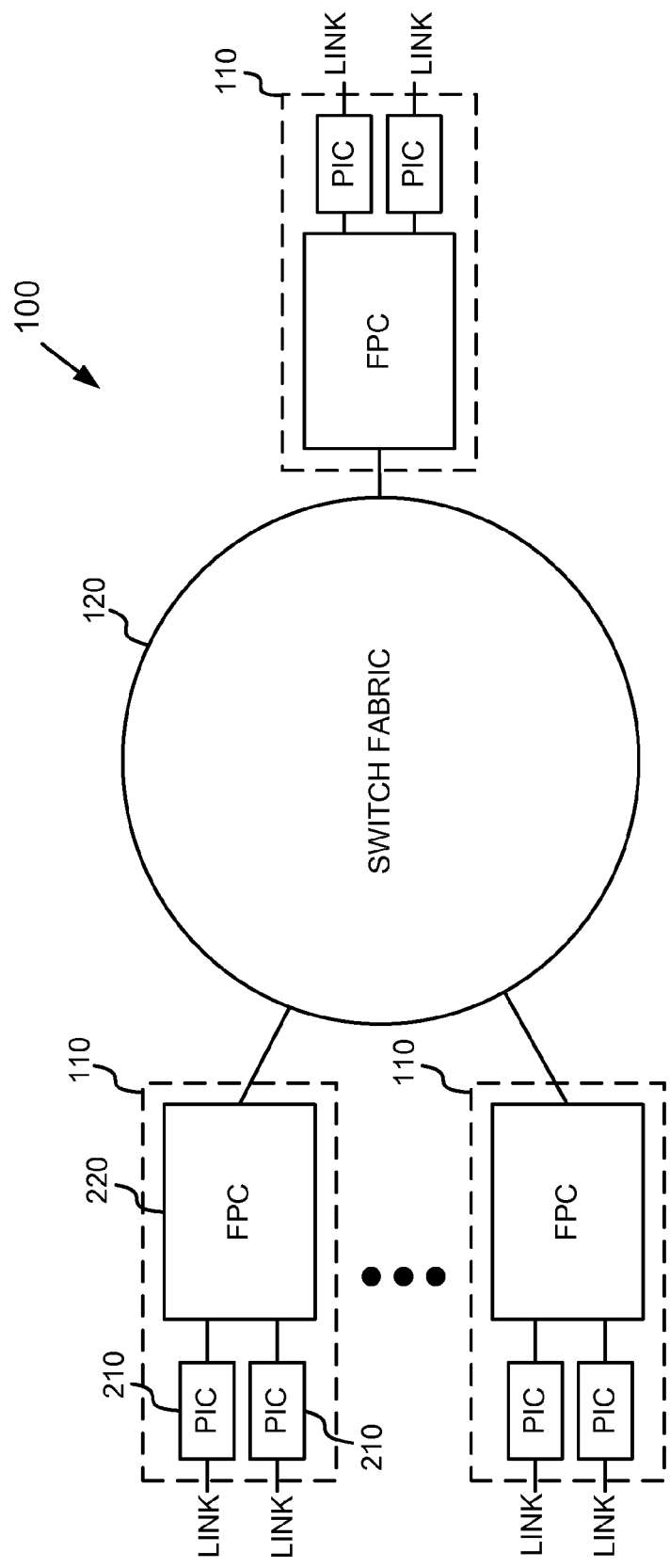
FIG. 2 is an exemplary detailed block diagram illustrating portions of the routing system shown in FIG. 1.

FIG. 2 is an exemplary detailed block diagram illustrating portions of routing system 100. PFEs 110 connect to one another through switch fabric 120. Each of the PFEs may include one or more physical interface cards (PICs) 210 and flexible port concentrators (FPCs) 220.

PIC 210 may transmit data between a physical link and FPC 220. Different PICs are designed to handle different types of physical links. For example, one of PICs 210 may be an interface for an optical link while another PIC may be an interface for an Ethernet link.

FPCs 220 perform routing functions and handle packet transfers to and from PICs 210 and switch fabric 120. For each packet it handles, an FPC performs the previously-discussed route lookup function. Although FIG. 2 shows two of PICs 210 connected to each of FPCs 220 and three FPCs 220 connected to switch fabric 120, in other embodiments consistent with principles of the invention there can be more or fewer PICs 210 and FPCs 220.

Figure 3:
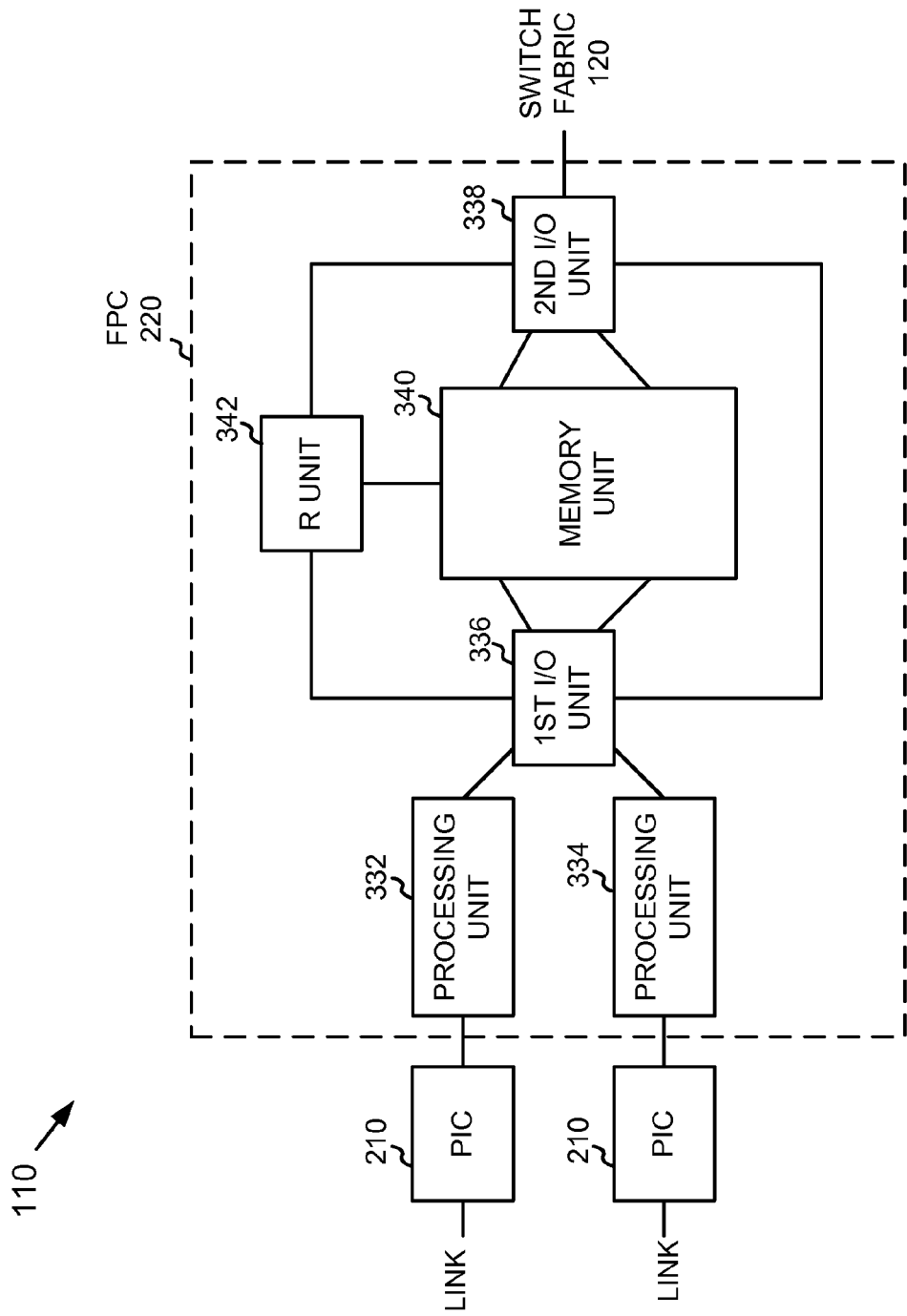
FIG. 3 is a diagram illustrating portions of FIG. 2 in additional detail.

FIG. 3 is an exemplary configuration of one of FPCs 220 according to an implementation consistent with the principles of the invention. Each FPC may include processing units 332 and 334, first input/output (I/O) unit 336, second I/O unit 338, memory unit 340, and R unit 342. Each processing unit 332 and 334 corresponds to one or more of PICs 210.

As will be described in greater detail below, processing units 332 and 334 may process packet data flowing between PICs 210 and first I/O unit 336. Each processing unit 332 and 334 may process packet data received from the PIC connected to it, and data received from first I/O unit 336.

For example, processing unit 332 or 334 may process packets from PIC 210 to convert the packets into data cells, and transmit the data cells to first I/O unit 336. Data cells are the data structure used by FPC 220 internally for transporting and storing data. In one implementation, data cells are 64 bytes in length.

In the other direction, processing unit 332 or 334 receives data cells and notifications from first I/O unit 336, extracts certain information and packet data from the data cells, and creates a packet based on the extracted information. Processing unit 332 or 334 creates the packet header based on the information extracted from the data cells. In one embodiment, processing unit 332 or 334 creates L2 and L3 header information based on the extracted information. The created L2 and L3 header information constitutes a new header that the packet uses as it is subsequently transmitted through the physical link.

R unit 342 may receive notifications from first I/O unit 336 and second I/O unit 338. R unit 342 may provide route lookup, accounting, and policing functionality based on the notifications. R unit 342 may receive one or more forwarding tables from RE 130 (FIG. 1) and use the keys, forwarding table(s), and encapsulation tables to perform route or encapsulation lookups. R unit 342 may insert the lookup result into a notification, which it may store in memory unit 340.

Memory unit 340 may temporarily store data cells from first I/O unit 336 and second I/O unit 338 and notifications from R unit 342. Memory 340 may dispatch the notifications to first I/O unit 336 and second I/O unit 338. In response, first I/O unit 336 and second I/O unit 338 may use the address information in the notification to read out data cells from memory unit 340 that correspond to a notification. The notification received from memory unit 340 may have been modified by R unit 342 with route or encapsulation lookup results. First I/O unit 336 and second I/O unit 338 may update the data cells read out of memory unit 340 with information from the modified notification. The data cells, which now include information from the modified notification, are sent to processing unit 332, processing unit 334, or switch fabric 120, depending on which of first I/O unit 336 or second I/O unit 338 is processing the notification.

Creation of L2 and L3 Header Information

Figure 4:
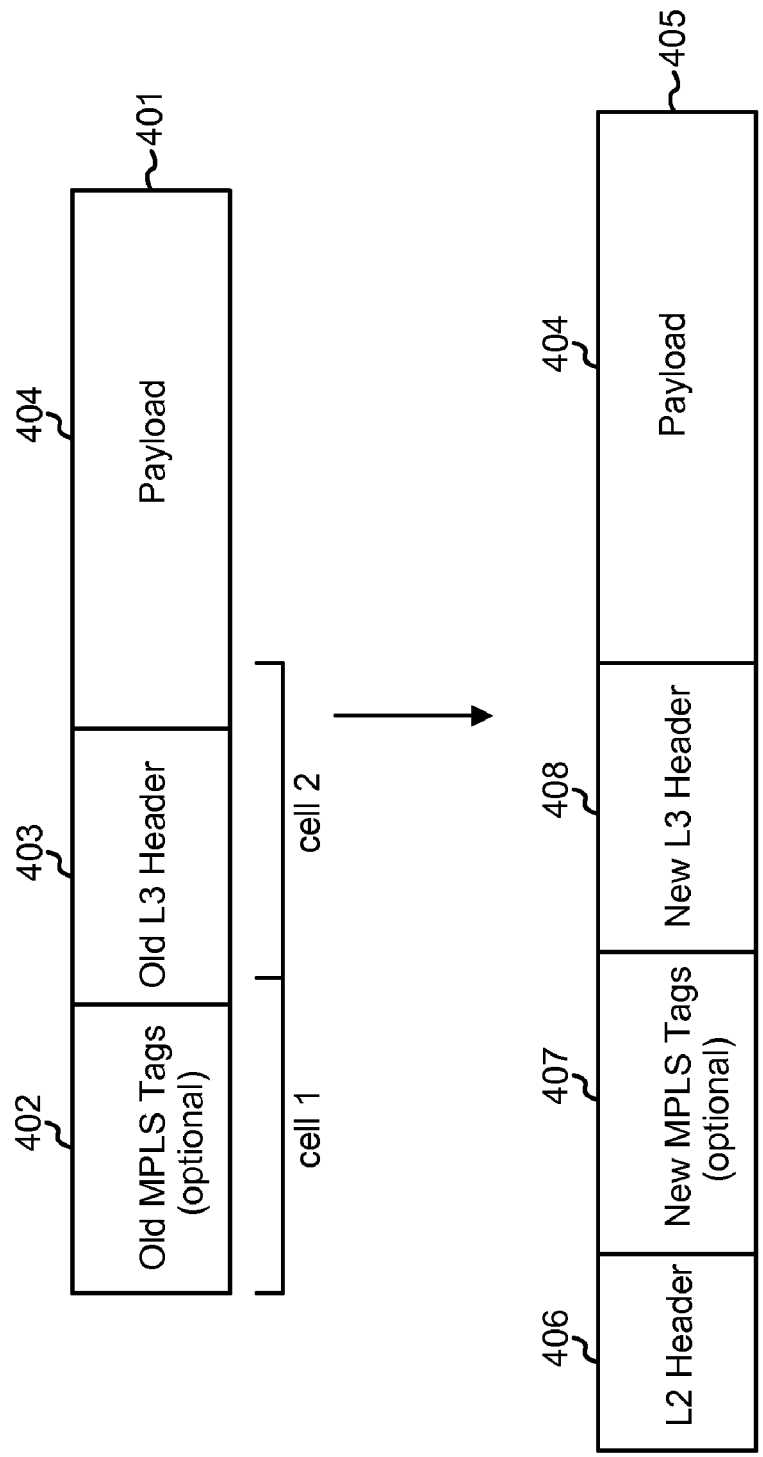
FIG. 4 is a diagram illustrating components of a packet.

As previously mentioned, processing units 332 and 334, when receiving cells form first I/O unit 336, may create new packet L2 and L3 header information before sending the packet to PIC 210 for eventual transmission to the physical links. FIG. 4 illustrates possible changes made to a packet by processing units 332 and 334.

Packet 401, when received by processing unit 332 or 334 from first I/O unit 336, may include "old" MPLS (multi-protocol label switching) tags 402, an "old" L3 header field 403 (i.e., the L3 header associated with the packet as originally received by router 100), and the payload 404 of the packet. At this point, the original L2 header received with the packet has previously been stripped from the packet by processing units 332/334. Accordingly, no old L2 header information is shown associated with packet 401. MPLS involves setting a specific path for a given sequence of packets, identified by a label in the MPLS tag field.

Processing unit 332 or 334 processes packet 401 and generates a modified version of the packet, labeled as packet 405. Packet 405 includes newly generated L2 header field 406, new MPLS tags 407 (optional), new L3 header field 408, and payload 404. New MPLS tags 407 and L3 header field 408 may contain new information, although, in certain cases, the information may be the same as old MPLS tags 402 and old L3 field 403.

As is also illustrated in FIG. 4, old L3 header field 403 and old MPLS tags 402 are contained within the first two cells of a packet. A portion of the payload 404 may also be contained in the first two cells. In alternate implementations, header field 403 and old MPLS tags 402 may be contained in more or less than the first two cells of the packet. The particular mapping of packet information to cells may vary in other implementations consistent with the principles of the present invention.

Figure 5:
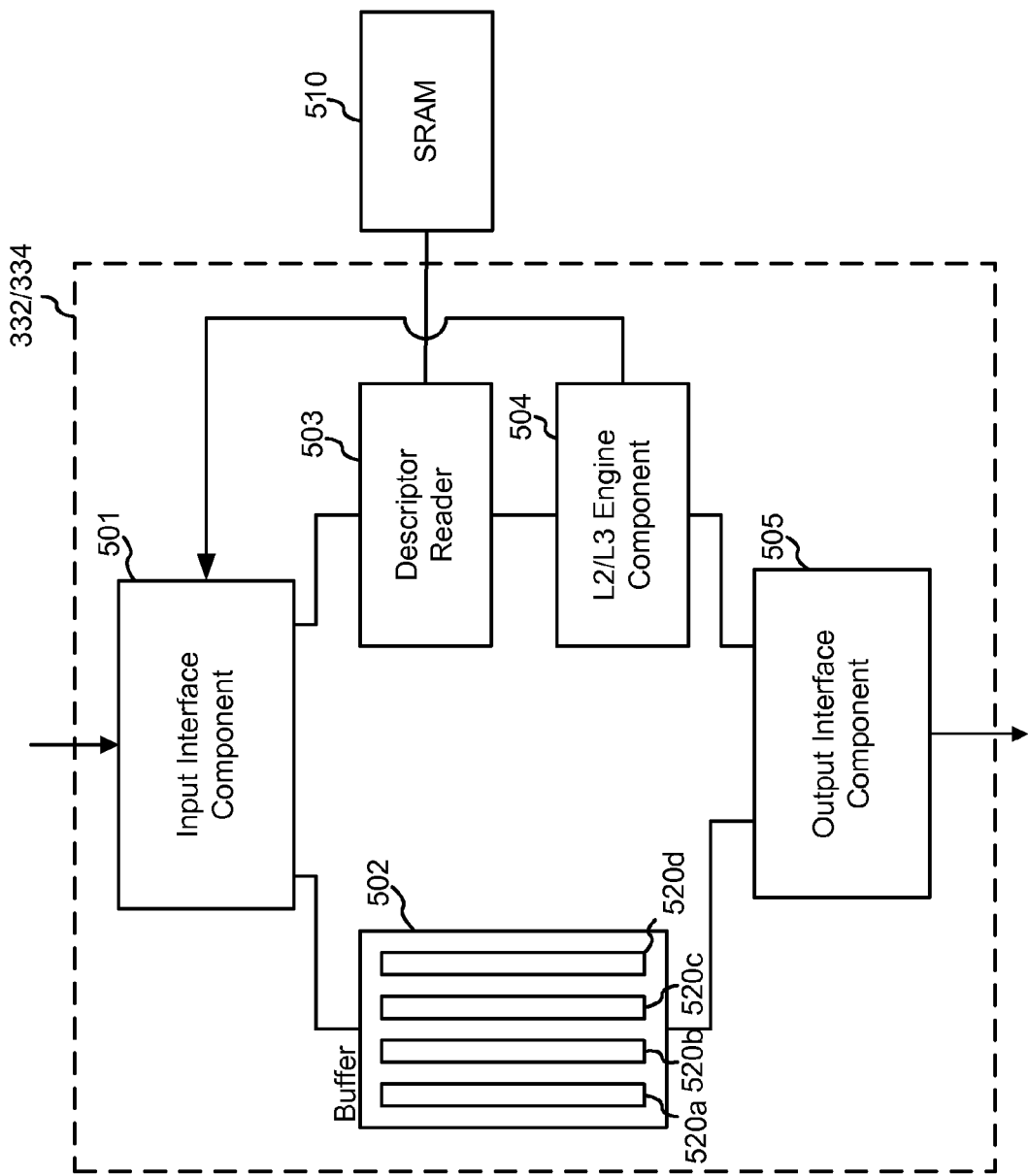
FIG. 5 is a diagram illustrating elements of the processing units shown in FIG. 3.

FIG. 5 illustrates elements of processing units 332/334 as they relate to generation of the L2/L3 header information in fields 406-408. As shown, processing unit 332/334 may include an input interface component 501 connected to a buffer 502 and descriptor reader component 503. Descriptor reader component 503 transmits information to L2/L3 engine component 504, which generates the new L2/L3 header information of fields 406-408 and forwards the generated information to output interface 505.

In operation, packet data from first I/O unit 336 is received by input interface component 501 as a series of cells. Input interface component 501 checks the received data for errors, and if the packet data is acceptable, stores the packet data to buffer 502. Buffer 502 may be implemented as a series of logical queues 520a-520d (collectively "520"), in which each of queues 520 may correspond to a series of cells for a packet stream. Input interface component 501 monitors the cells stored in queues 520, and when enough cells are present in a queue to start header processing, interface component 501 transfers up to the first two cells (i.e., the cells containing the packet header information) in the queue to descriptor reader component 503. Descriptor reader component 503 may access external SRAM 510 before forwarding the two cells, along with information retrieved from SRAM 510, to L2/L3 engine component 504. SRAM 510 may store descriptor information required by L2/L3 engine component 504 in generating the new L2/L3 header information. Through SRAM 510, additional control information or data for the new L2/L3 header information can be associated with the packet.

L2/L3 engine component 504 generates the new L2/L3 header information for a packet, such as the information in fields 406, 407, and 408 (FIG. 4). The operation of L2/L3 engine component 504 will be described in more detail below.

Output interface component 505 receives the new header information from L2/L3 engine component 504 and the corresponding remaining payload for the packet from buffer 502. Output interface 505 may then assemble the packet, such as packet 405 (FIG. 4), using the received header and payload.

In certain circumstances (e.g., handling packet fragmentation), L2/L3 engine component 504 may send the new L2/L3 header information for a packet to input interface component 501 and to output interface component 505. One instance of such header "recycling" is described below with reference to FIG. 16. In typical circumstances, however, the new L2/L3 header information is sent to output interface component 505.

L2/L3 Engine Component

Figure 6:
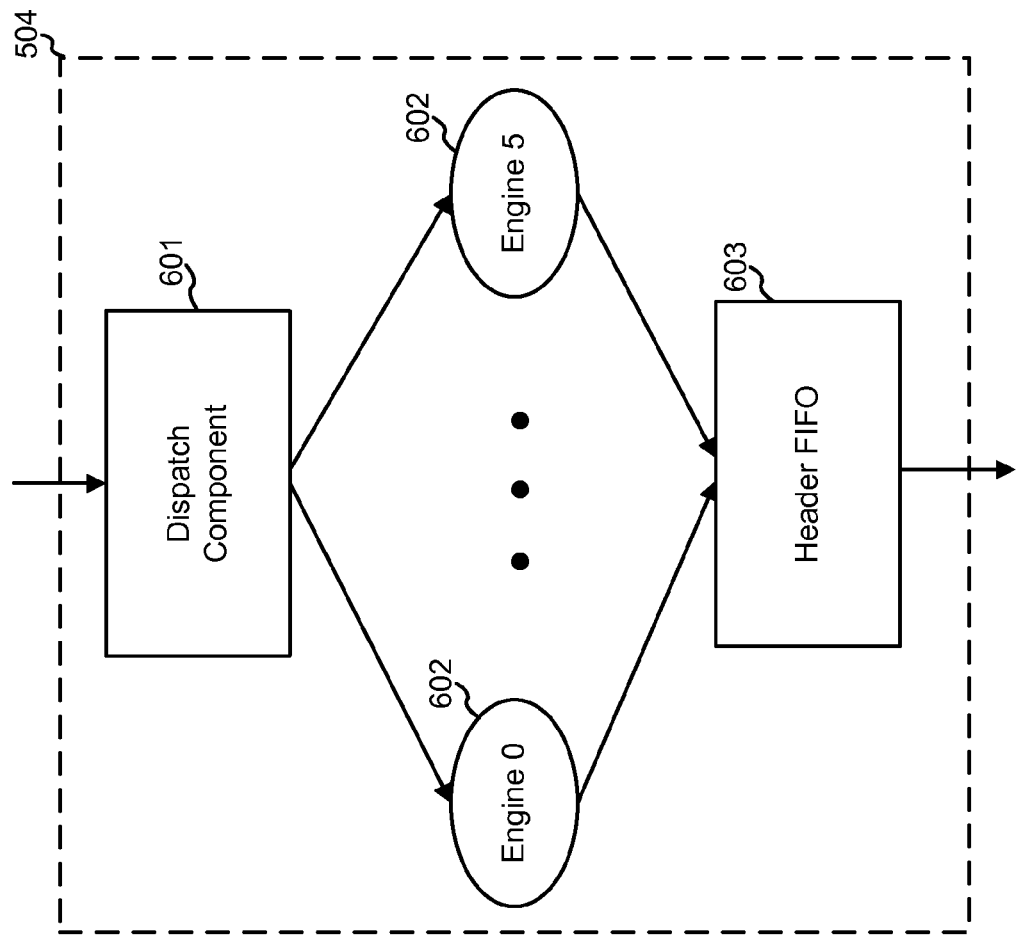
FIG. 6 is a diagram illustrating an L2/L3 engine component having six parallel engines.

As previously mentioned, the L2/L3 engine component 504 generates the L2 and L3 header information for a packet. To increase bandwidth, multiple L2/L3 engines may be implemented in parallel within the L2/L3 engine component 504. FIG. 6 is a diagram illustrating an embodiment of the L2/L3 engine component 504 having six parallel L2/L3 engines 602. In other implementations, more or less than six engines 602 may be used. Dispatch component 601 directs incoming packet header information to one of L2/L3 engines 602. Dispatch component 601 may function to evenly distribute the incoming packet header information to the L2/L3 engines 602 such that total bandwidth through the engines is maximized.

Header FIFO component 603 receives the processed L2/L3 packet header information generated by L2/L3 engines 602 and queues the processed header for transmission to output interface component 505 (FIG. 5). Before transmitting the header information, header FIFO component 603 may first tell the output interface 505 the size of the header and the size of the remaining data in data buffer 502. In response, output interface 505 may start to read the remaining data from data buffer 502.

In one implementation, header FIFO component 603 ensures that the packets it is about to transmit are in the sequence in which the packets of a data flow were received. Ordering may be ensured by unit 502, prior to dispatching a packet to the descriptor reader 503 and eventually L2/L3 engine component 504, reserves a space in the header FIFO 603. Because packets are dispatched in order by unit 502, the space allocated is also in order in the header FIFO component 603. Even when packets reach header FIFO component 603 at different times, the packets will be stored in the header FIFO 603 in the order they are dispatched, and thus will be transmitted in order.

Figure 7:
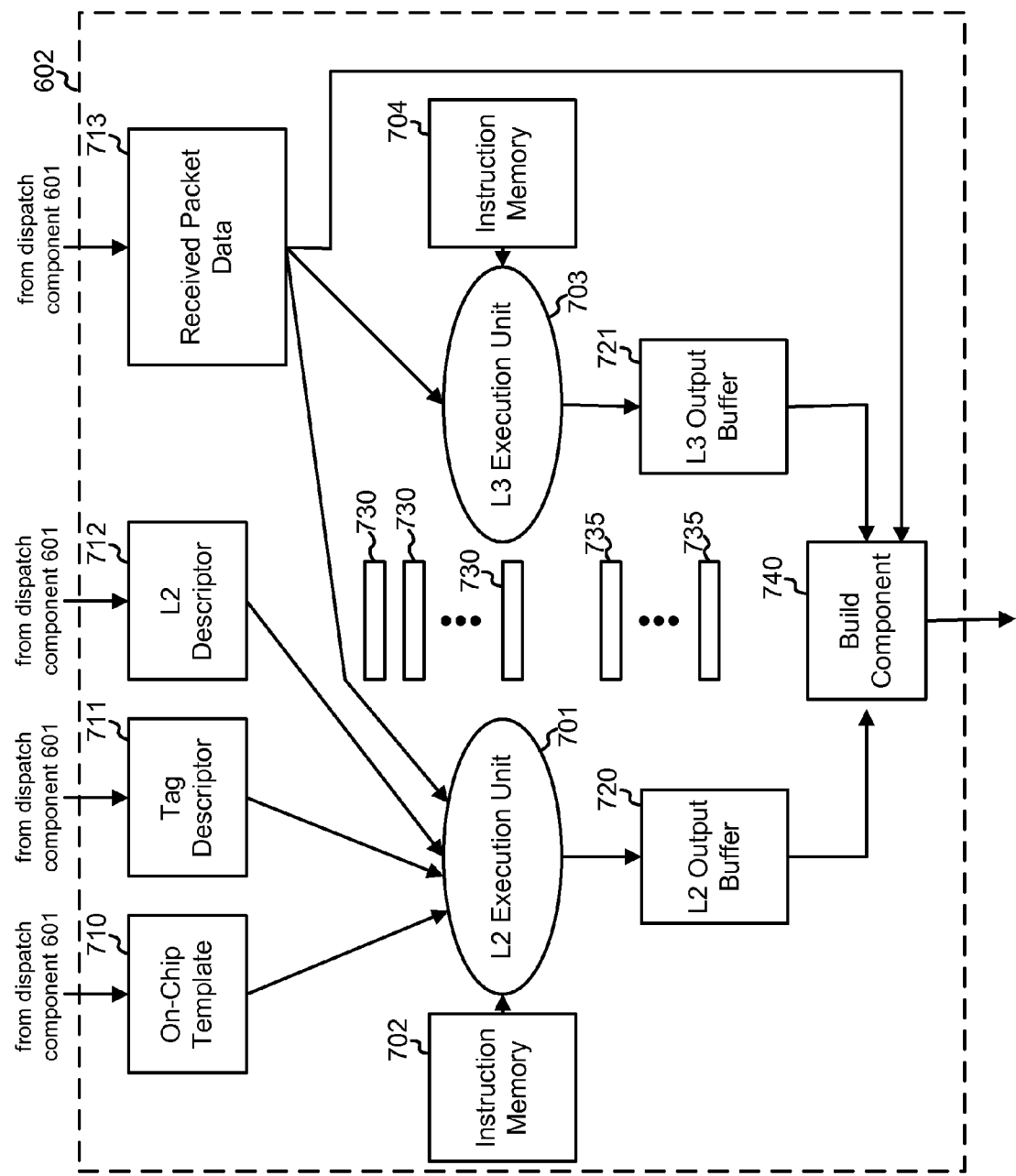
FIG. 7 is a diagram illustrating one of L2/L3 engines shown in FIG. 6.

FIG. 7 is a diagram illustrating an embodiment of one of L2/L3 engines 602 consistent with the principles of the invention. In engine 602, the portion of the L2/L3 engine 602 that generates the L2 header information may be implemented in parallel with the portion of the L2/L3 engine that generates the L3 header information. In this manner, the L2 header information can be generated simultaneously with the L3 header information. More specifically, L2 execution unit 701 and L3 execution unit 703 are implemented in parallel with one another. The L2 execution unit 701 is responsible for building the L2 header information. In one implementation, L2 execution unit 701 is implemented as a single processing unit that processes one instruction each clock cycle. The L3 execution unit 703 is responsible for building the L3 header information. The L3 execution unit 703 may be constructed as three parallel processing units.

L2 execution unit 701 operates on input packet header information by executing instructions stored in instruction memory 702. Dispatch component 601 writes the input packet header information to memory 713 by storing cells including packet header information in memory 713. In operation, L2 execution unit 701 retrieves the header data from memory 713 and generates the new L2 header information based on execution of the instructions stored in instruction memory 702. When calculating the new L2 header information, L2 execution unit 701 may additionally read from or write to template memory 710, tag descriptor memory 711, and L2 descriptor memory 712. Template memory 710 may store on-chip template data for a packet. Such template data may be common to different headers, and may be initially stored on-chip in a memory (not shown). Tag descriptor memory 711 and L2 descriptor memory 712 may include the descriptor information read by descriptor reader 503 from SRAM 510.

L3 execution unit 703 may execute instructions stored in instruction memory 704. In a manner similar to L2 execution unit 701, L3 execution unit 703 retrieves the header information for a packet from memory 713 and generates the new L3 header information based on execution of the instructions stored in instruction memory 704.

Buffers 720 and 721 store the header information generated by the execution units. More specifically, as L2 execution unit 701 generates the L2 header information, it may write it into buffer 720. Similarly, as L3 execution unit 702 generates the L3 header information, it writes the information into buffer 721.

Build component 740 assembles the L2 and L3 header information from L2 output buffer 720 and L3 output buffer 721.

Registers 730 and 735 are storage registers useable by L2 execution 701 and L3 execution 703. In one implementation, registers 730 are each 32-bit general purpose storage registers and registers 735 are 32-bit mailbox registers. There may be, for example, sixteen general purpose storage registers 730 and eight mailbox registers 735. The mailbox registers 735 allow execution units 701 and 702 to exchange information with one another. The mailbox registers 735 may be pre-designated such that only certain resources can write to a particular one of the mailbox registers while only certain other resources can read from the particular mailbox register. Thus, for example, only the L2 execution unit 701 may be allowed to write to the first mailbox register and only L3 execution unit 703 may be allowed to read from this mailbox register.

Operation of L2/L3 Execution Units 701 and 703 with their Output Buffers 720 and 721

The operation of execution units 701 and 703 when interacting with output buffers 720 and 721 will next be described.

Input packet header data stored in memory 713 is read by L2 execution unit 701 and L3 execution unit 703, as required by these units. Periodically, L2 execution unit 701 writes to buffer 720. Similarly, L3 execution unit 703 periodically generates writes to buffer 721. These write operations to buffers 720 and 721 are not time correlated with one another. Eventually, L2 execution unit 701 and L3 execution unit 703 each finish writing to their respective output buffers 720 and 721. Typically, L2 execution unit 701 and L3 execution unit 703 finish writing to output buffers 720 and 721 at different times. When both have finished writing to their output buffers, build component 740 combines the results of both buffers to form the complete header for the packet.

As shown in FIG. 4, the final packet header generated by output interface 505 includes L2 header fields 406 and 407 followed by the L3 header field 408. By independently buffering the L2 header data and L3 header data, and then combining the L2 and L3 header data, L2 execution unit 701 and L3 execution unit 703 are able to operate in parallel. This is advantageous, as it allows for more efficient generation of a packet header relative to a serial implementation that first generates L2 header information and then generates L3 header information.

Figure 8:
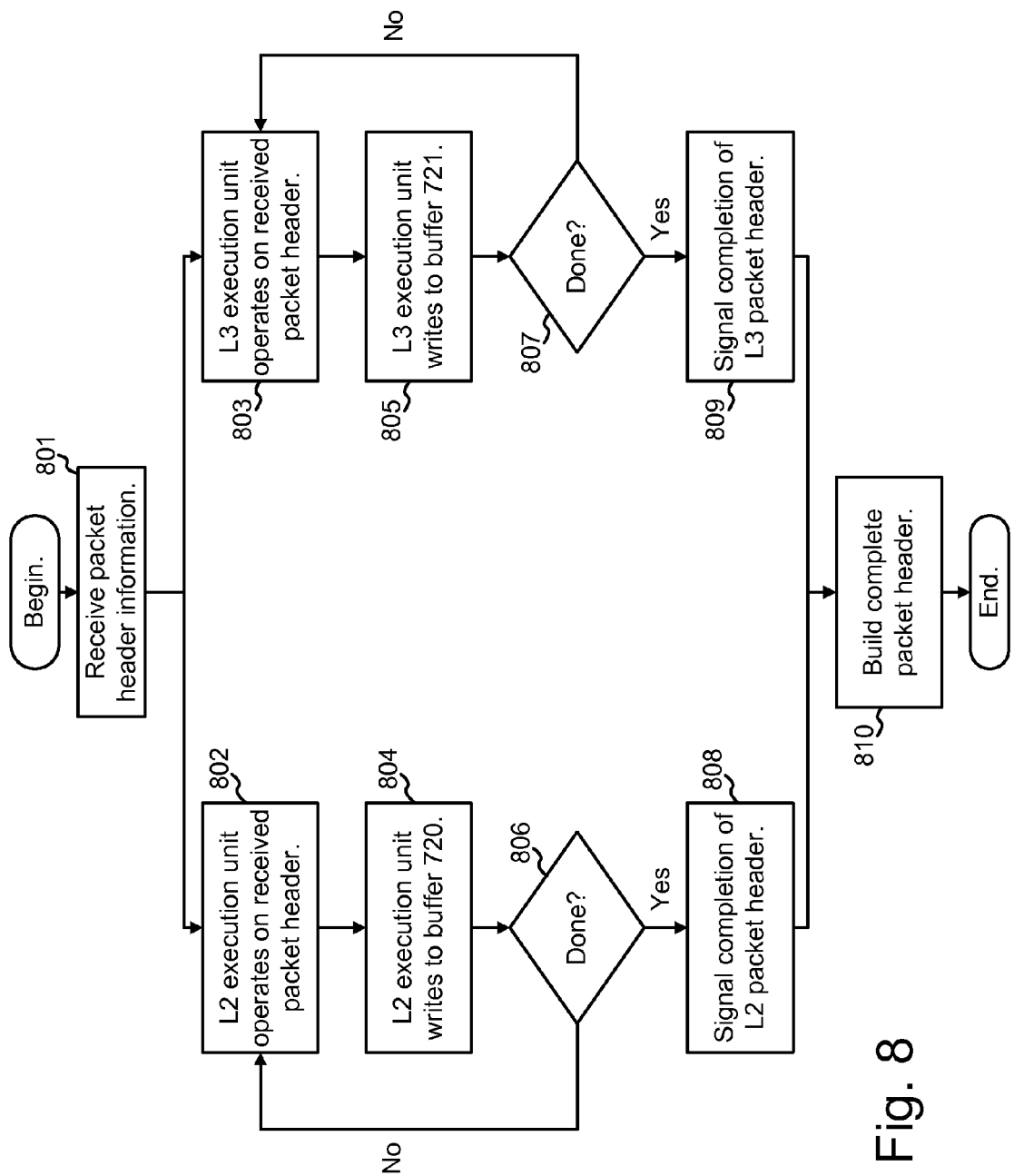
FIG. 8 is a flow chart illustrating operation of the L2/L3 engines shown in FIGS. 6 and 7.

FIG. 8 is a flow chart illustrating operation of L2/L3 engines 602 consistent with principles of the invention. To begin, received packet header data is accessed by L2 execution unit 701 and L3 execution unit 703 (acts 801, 802, 803). L2 execution unit 701 and L3 execution unit 703 independently operate on the received packet header. During operation, L2 execution unit 701 may write new L2 packet header data to buffer 720 (act 804) and L3 execution unit 703 may write new L3 packet header data to buffer 721 (act 805). When the L2 execution unit finishes writing the L2 packet data to buffer 720, it signals its completion to build component 740. The L3 execution unit similarly signals its completion of writing the L3 packet data to buffer 721 (acts 807 and 809). Finally, build component 740, in response to the signals indicating completion of the L2 and L3 header data, loads the L2 packet header from buffer 720, loads the L3 packet header from buffer 721, loads any remaining packet data from memory 713, and builds the complete packet header (act 810).

Input/Output of Data in L2/L3 Engines 602

As discussed above, L2/L3 engines 602 receive old packet header data from dispatch component 601, generate the new packet header data, and transmit the new packet header data to build component 740 from buffers 720 and 721. In this manner, each of the L2/L3 engines operate on a single packet at any given time. Consistent with an aspect of the invention, L2/L3 engines 602 may increase the efficiency with which they load and unload packets by simultaneously loading header data for a next packet while unloading the packet header data that was most recently generated.

Figure 9:
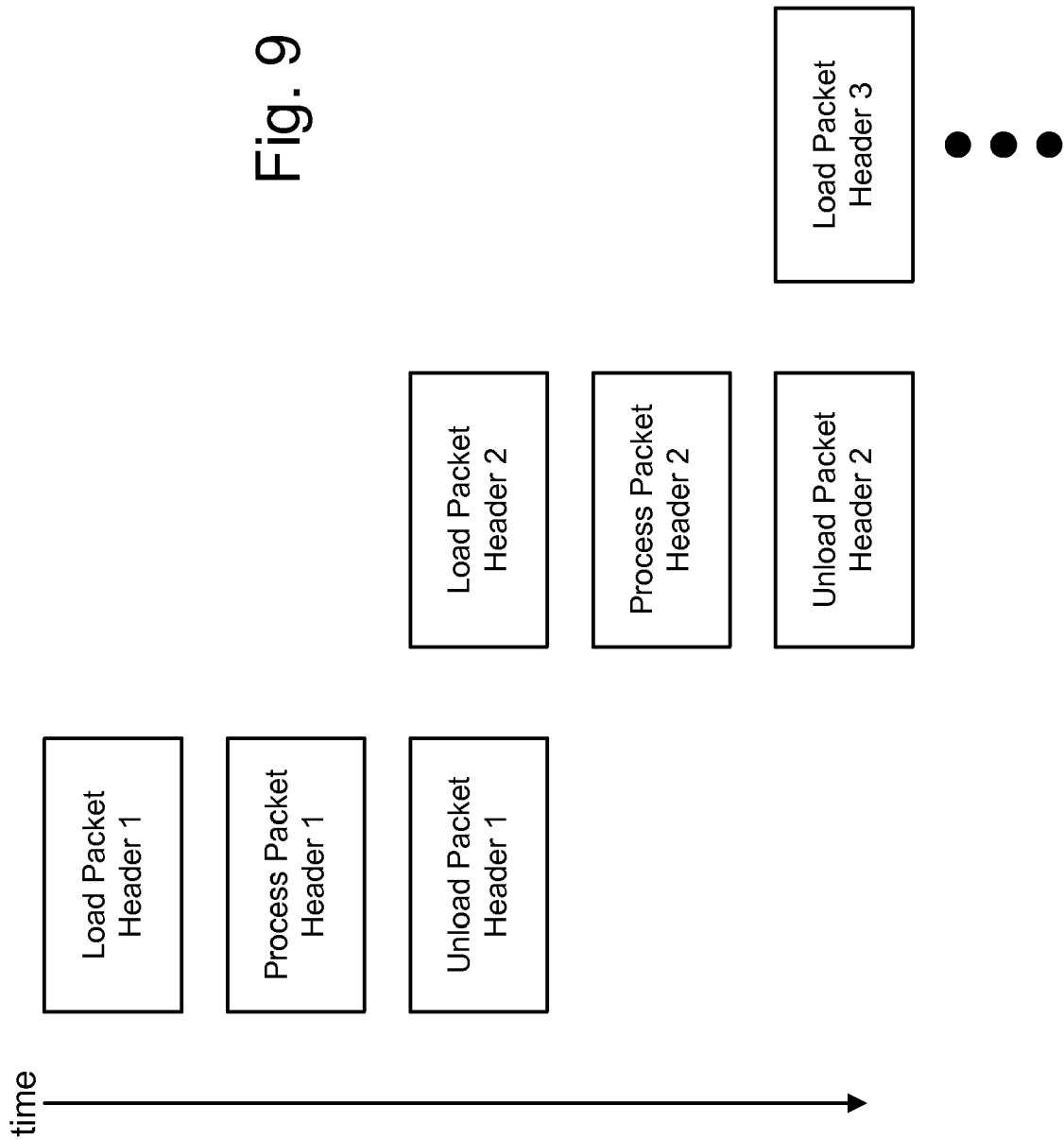
FIG. 9 is a diagram conceptually illustrating the loading and unloading of data in the L2/L3 engines 602.

FIG. 9 is a diagram conceptually illustrating the loading and unloading of data in the L2/L3 engines 602. Packet header data for a first packet is received from dispatch component 601 and loaded into packet header memory 713. Dispatch component 601 may also transmit data to on-chip template memory 710, tag descriptor memory 711, and/or L2 descriptor memory 712. Additionally, dispatch component may preload general purpose registers 730 with information such as, for example, packet length information, fragmentation information for the packet, or information relating to the MPLS tags. This loaded information is then processed by the L2 execution unit 701 and L3 execution unit 703, as discussed above.

When both the L2 execution unit 701 and the L3 execution unit 703 have finished writing the new packet header data to buffers 720 and 721, build component 740 unloads the buffers by reading the new packet header data from the buffers. Simultaneously, dispatch component may begin to transit data associated with the next packet into memories 710-713. In this manner, processing of the next packet by L2/L3 engine 602 can begin sooner than if the L2/L3 engine waited until a packet was fully removed from the L2/L3 engine before beginning processing on the next packet.

Mailbox Registers

As shown in FIG. 7, the L2/L3 engines 602 include general purpose storage registers 730 and mailbox registers 735. Mailbox registers 735 allow execution units 701 and 702 to exchange information with one another and with external devices, such as an external host computer (not shown).

Figure 10:
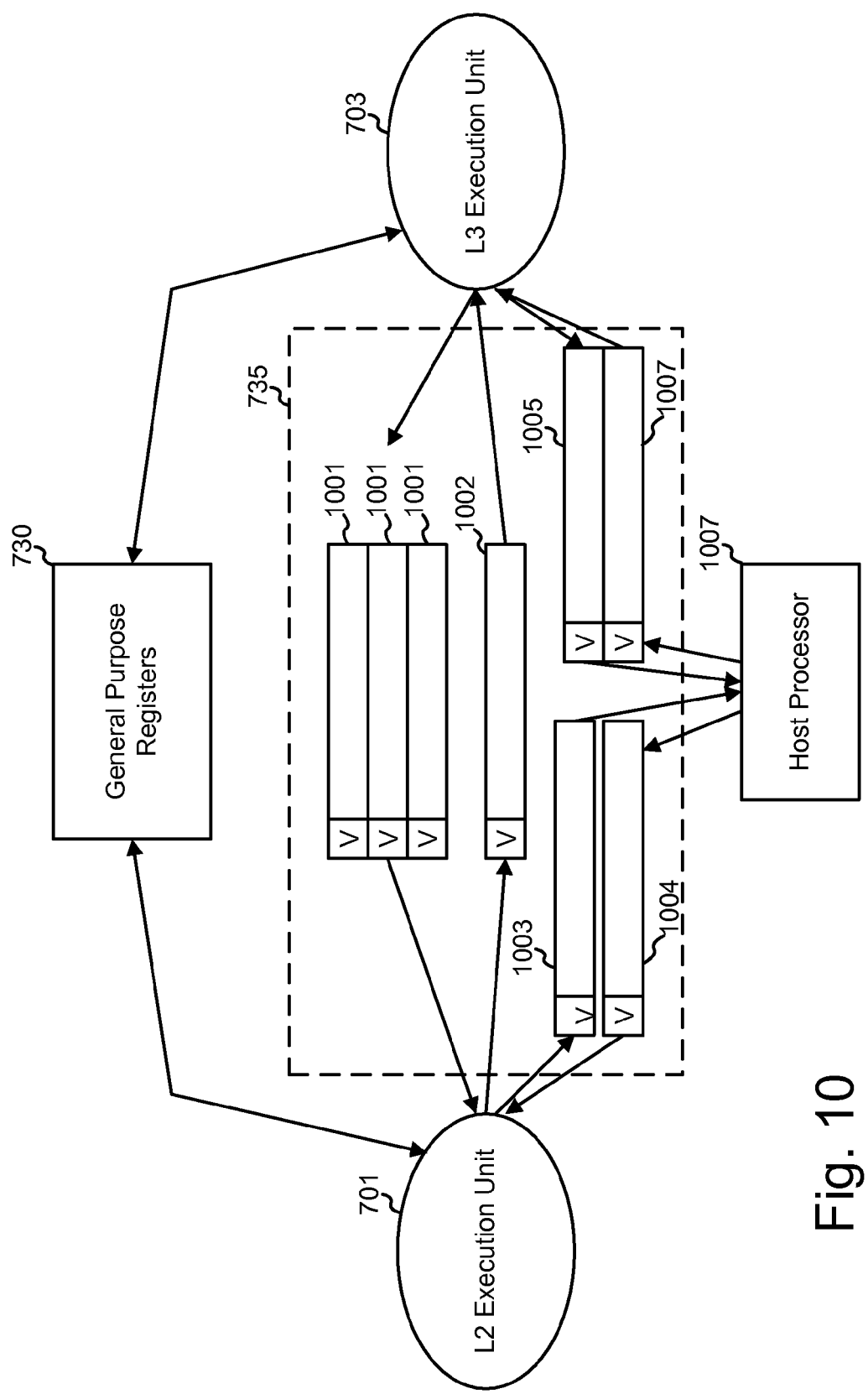
FIG. 10 is a diagram illustrating the operation of mailbox registers.

FIG. 10 is a diagram illustrating an implementation of the mailbox registers 735 consistent with the principles of the invention. Both L2 execution unit 701 and L3 execution unit 703 can write and read from any of general purpose registers 730. Mailbox registers 735, however, are each "one-way" registers that are designed to be written to by a single resource and read from by another resource. Specifically, as shown in the exemplary implementation of FIG. 11, three mailbox registers 1001 are used to transfer information from L3 execution unit 703 to L2 execution unit 701, one mailbox register 1002 is used to transfer information from L2 execution unit 701 to L3 execution unit 703, one mailbox register 1003 is used to transfer information from L2 execution unit 701 to host processor 1007, one mailbox register 1004 is used to transfer information from host processor 1007 to L2 execution unit 701, one mailbox register 1005 is used to transfer information from L3 execution unit 703 to host processor 1007, and one mailbox register 1006 is used to transfer information from host processor 1007 to L3 execution unit 703. Host processor 1007 may be, for example, a processor used in programming and debugging L2/L3 engines 602.

In one implementation, each of mailbox registers 1001-1007 is a 32-bit register associated with an additional valid ("V") bit. The valid bits inform the resources associated with the mailbox (i.e., the L2 execution unit, the L3 execution unit, and the host processor) whether the mailbox is waiting to be read or is available to be written. Thus, for example, when the L2 execution unit 701 wishes to write to mailbox register 1002, it first checks the state of the valid bit. If the valid bit is not set (i.e., it is a logic zero), L2 execution unit 701 writes its data to mailbox register 1002 and sets the valid bit. If, however, the valid bit is set (i.e., it is a logic one), the L2 execution unit waits until the L3 execution unit 703 resets the valid bit before writing to mailbox register 1002. Correspondingly, L3 execution unit 703 waits until the valid bit is set before reading from mailbox register 1002. After reading the mailbox register, L3 execution unit 703 resets the valid bit.

Although the above description of mailbox registers 1001-1006 included a certain number of mailbox registers 1001-1006, one of ordinary skill in the art will recognize that more or less mailbox registers 1001-1006 could be used for each set of mailbox registers 1001-1006.

Detailed Description of L2 and L3 Execution Units

Figure 11:
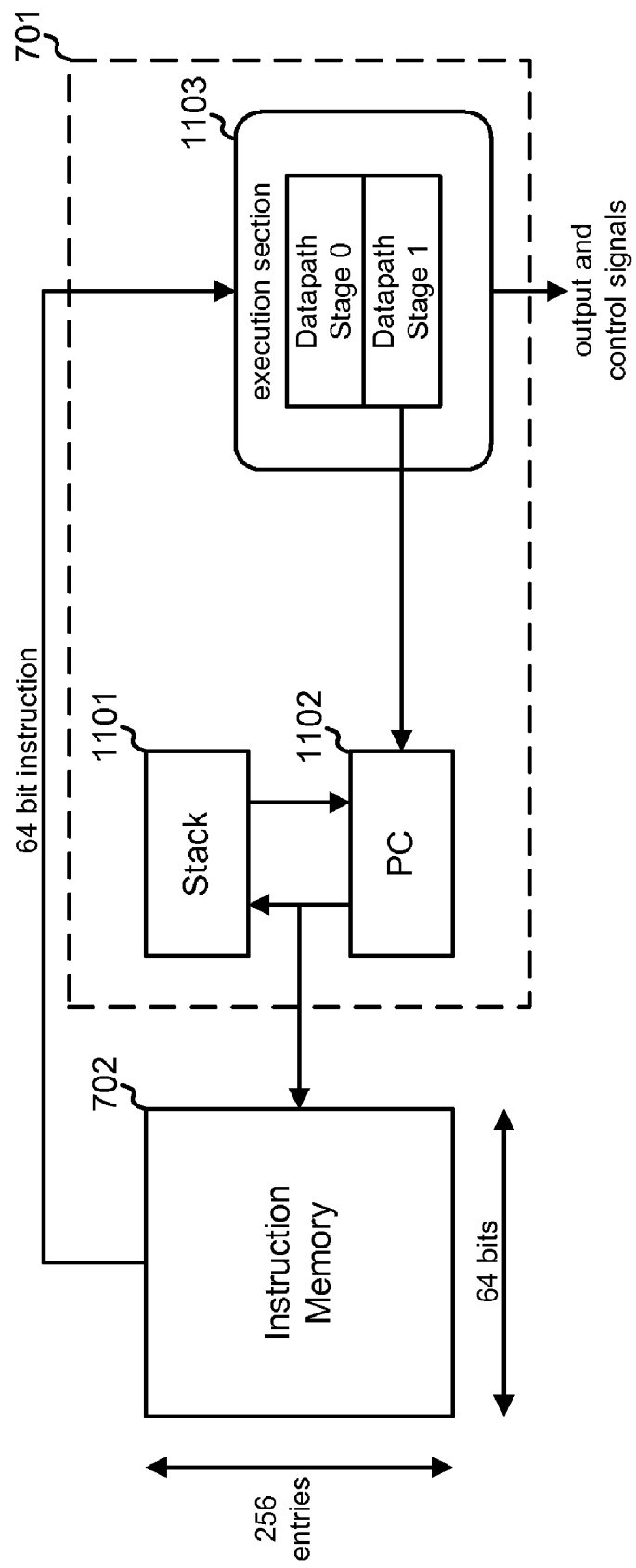
FIG. 11 is a diagram illustrating the L2 execution unit of FIG. 7 in additional detail.
Figure 12:
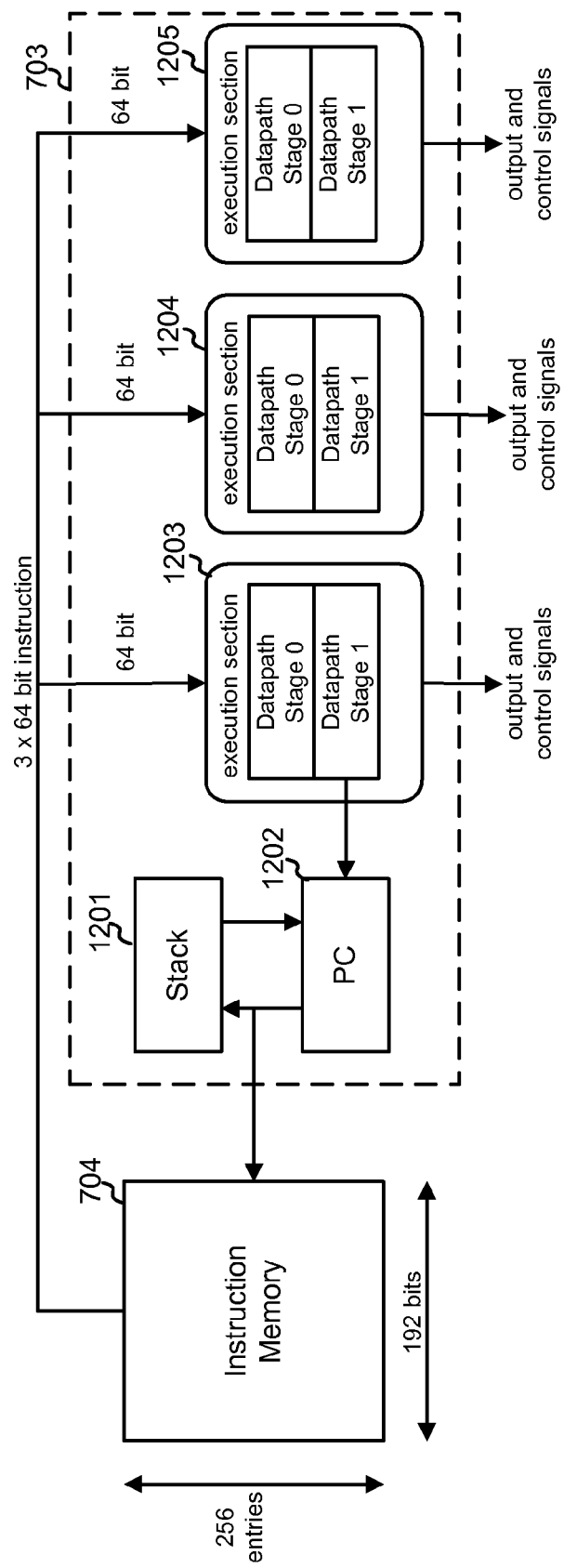
FIG. 12 is a diagram illustrating the L3 execution unit of FIG. 7 in additional detail.

FIGS. 11 and 12 are diagrams illustrating, in additional detail, L2 execution unit 701 and L3 execution unit 703, respectively, in accordance with concepts consistent with the invention.

As previously mentioned, L2 execution unit 701 receives instructions from instruction memory 702. Instruction memory 702 may be a 64-bit wide memory. The particular instruction to retrieve from instruction memory 702 is determined by the value in program counter 1102. The selected instruction is received by execution section 1103. Execution section 1103 may be implemented as a two-stage pipeline. Stack 1101 is a single entry memory that may be used to temporarily store, for example, an incremented version of the value in program counter 1102.

Referring to FIG. 12, L3 execution unit 703 is constructed similarly to L2 execution unit 701, except that in addition to a single stack 1201 and a single program counter 1202, L3 execution unit 703 contains three parallel execution sections 1203, 1204, and 1205. Each execution section 1203-1205 simultaneously receives an instruction from instruction memory 704. Instruction memory 704 may be a 192-bit wide memory. Each 192-bit word read from instruction memory 704 is divided equally between execution sections 1203-1205 as three 64-bit instructions.

Although there are three execution sections 1203-1205 in L3 execution unit 703, only one of the execution sections, execution section 1203, is connected to program counter 1202. Thus, only execution section 1203 controls the program flow.

Execution sections 1203-1205 may communicate with one another through the general purpose registers 735. Generally, however, instructions are stored in memory 704 that allow execution sections 1203-1205 to function largely independently of one another. For example, one of the execution sections may work on computing a checksum while another of the execution sections computes a packet length.

Logical Separation and Accessing of Descriptor Memories 710, 711, and 712

As previously discussed, L2 execution unit 701 may read from or write to template memory 710, tag descriptor memory 711, and descriptor memory 712 when calculating new L2 header information. One implementation of memories 710-712 consistent with the principles of the invention is three separate first-in, first-out (FIFO) buffers. Different registers, for example, would be used in conjunction with the buffers to keep track of data within the FIFO buffers. Such an implementation, however, entails a significant delay for L2 execution unit 701 to obtain data from the memories 710-712.

Figure 13:
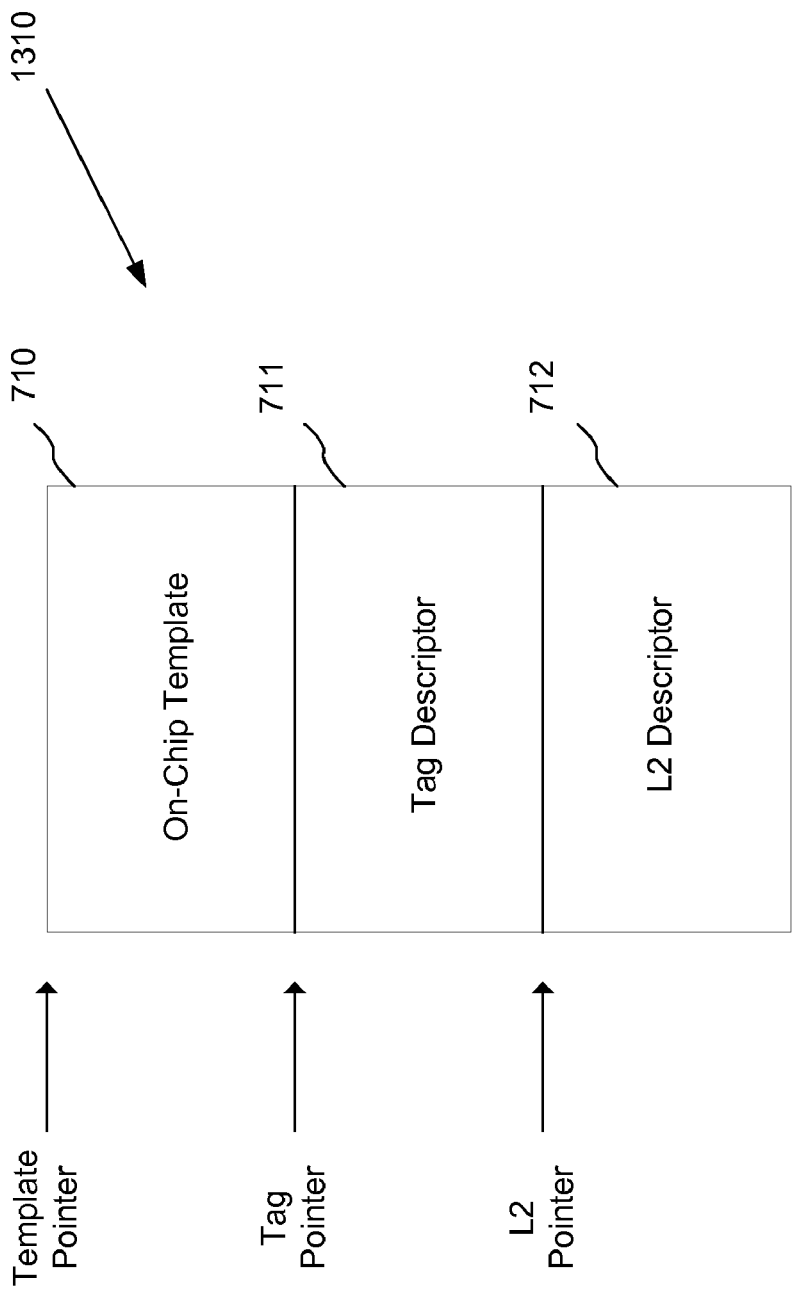
FIG. 13 is a diagram illustrating the descriptor memories of FIG. 7 in additional detail.

FIG. 13 is a diagram illustrating the memories 710, 711, and 712 of FIG. 7 in additional detail in an implementation consistent with the principles of the invention. A single descriptor memory 1310 may include template memory 710, tag descriptor memory 711, and L2 descriptor memory 712. In other words, template memory 710, tag descriptor memory 711, and L2 descriptor memory 712 may be logical portions of descriptor memory 1310, rather than separate physical memories. In one implementation, descriptor memory 1310 may be 40 bytes in size, and may be configured to provide data from any memory location addressed (e.g., random access).

Template memory 710 may store on-chip template data for a packet, and may begin at address 0 of descriptor memory 1310. Such template data may be common to different headers, and may be loaded into template memory 710 from an on-chip memory (not shown). Tag descriptor memory 711 may store tag descriptor data for MPLS tags from SRAM 510, and may begin at an address of descriptor memory 1310 that is determined by the size of the on-chip template data in template memory 710.

In one implementation, L2 descriptor memory 712 may include the L2 descriptor information read from SRAM 510, and may begin at an address of descriptor memory 1310 that is determined by the size of both the on-chip template data in template memory 710 and the tag descriptor data in tag descriptor memory 711. Data may be respectively written to template memory 710, tag descriptor memory 711, and L2 descriptor memory 712 by dispatch component 601 in a known order. In other implementations, descriptor memory 712 may include descriptor information from a level x (Lx) protocol, where x may indicate one of several protocols (e.g., L2, L3, etc.). Hence, descriptor memory 712 may be referred to generically as an "Lx descriptor memory" 712.

Current locations within template memory 710, tag descriptor memory 711, and L2 descriptor memory 712 may be respectively designated by a template pointer, a tag pointer, and an L2 pointer, all of which initially point to the beginning addresses of their respective memories. Certain details of the order in which L2 execution unit 701 reads from memories 710-712 may be specified by different instruction sequences selected by the L2 protocol (e.g., 802.3, SNAP, or PPP) of the packet whose L2 header is being processed. When data is read from, for example, template memory 710, the template pointer may be incremented by one or more addresses, determined by the number of bytes read, to simulate reading from a FIFO buffer. In the implementation shown in FIG. 13, L2 execution unit 701 need store only three pointers in logic, and may retrieve data from memories 710-712 more efficiently than from separate FIFO buffers. Further, data may be alternately read from memories 710-712 by switching from one of the respective pointers to another. Because of the ability to rapidly obtain data from memories 710-712, L2 execution unit 701 may process L2 headers more quickly.

On the Fly L3 Header Checksum Processing

In certain internet protocols, internet protocol version 4 (IPv4) for example, L3 header 408 that is generated L3 execution unit 703 may contain a checksum. The checksum may be used to detect corruption in a received packet. For example, the checksum for IPv4 may be 16 bits and may be contained within L3 header at a known location. As explained above, L3 execution unit 702 generates L3 header information and writes the information into L3 output buffer 721. Typically, the L3 header information is written to L3 output buffer 721 sequentially, with the checksum information being initially written as zeros. One way to generate the checksum would be for L3 execution unit 702 to wait until L3 output buffer 721 contains an entire L3 header, read the entire header, compute the checksum, and write the checksum to the appropriate position in L3 output buffer 721. Such checksum computation, however, would occupy L3 execution unit 702 for a large number of instruction cycles, thereby delaying further L3 header processing.

Figure 14:
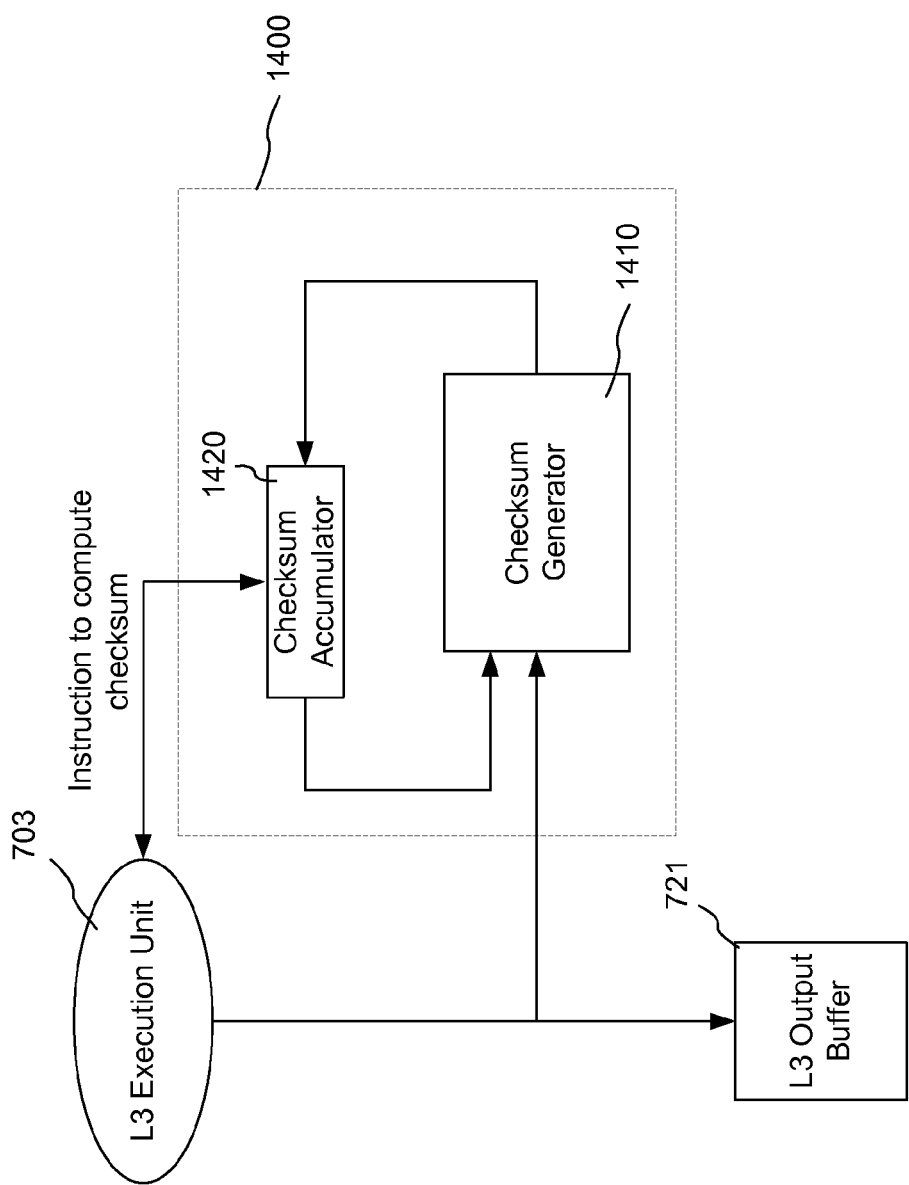
FIG. 14 is a diagram illustrating checksum processing hardware in conjunction with the L3 execution unit of FIG. 7.

FIG. 14 is a diagram illustrating checksum processing element 1400 and its relation to L3 execution unit 703. Checksum processing element 1400 may be situated in the data flow between L3 execution unit 703 and L3 output buffer 721, as shown in FIG. 14. Checksum processing element 1400 may include a checksum generator 1410 and a checksum accumulator 1420. One of the general purpose registers 730 described in FIG. 7 may be used as checksum accumulator 1420.

Checksum generator 1410 may include logic configured to compute a checksum using inputs of L3 information from L3 execution unit 703 and checksum data from checksum accumulator 1420 when instructed by the L3 execution unit 703. In some implementations, such an instruction may be implicit (i.e., the checksum may be computed by default). In one implementation, L3 execution unit 703 may initially load checksum accumulator 1420 with an initial value when it writes the first L3 information for a new L3 header to L3 output buffer 721. In another implementation consistent with the present invention, L3 execution unit 703 may pre-load checksum accumulator 1420 with a value before it writes the first L3 information for a new L3 header to L3 output buffer 721. In subsequent writings of L3 information to L3 output buffer 721, checksum generator 1410 may read stored checksum data from checksum accumulator 1420 and compute a new checksum using the stored checksum data and the L3 information being written to L3 output buffer 721. Checksum generator 1410 may store this new (partial) checksum in checksum accumulator 1420. In this manner, checksum processing element 1400 updates the L3 checksum "on the fly" (i.e., concurrently) as the L3 header information is written to L3 output buffer 721 by L3 execution unit 703.

When L3 output buffer 721 contains an entire L3 header, checksum accumulator 1420 contains the checksum for that L3 header. L3 execution unit 703 may write the checksum from checksum accumulator 1420 to the appropriate address in L3 output buffer 721. Because of the checksum processing element 1400, L3 execution unit 703 may use only two instruction cycles for checksum processing: one instruction cycle to initially load checksum accumulator 1420, and one instruction cycle to write the complete checksum from checksum accumulator 1420 to L3 output buffer 721. Because of the ability to concurrently compute the L3 header checksum, L3 execution unit 703 may process L3 headers more quickly. Although described with respect to L3 headers, it is specifically envisioned that checksum processing elements similar to checksum processing element 1400 may be used to compute other checksums on the fly as well.

Fragment Handling

Physical links with certain interface types, such as SONET, Ethernet, ATM, etc., have associated limits on the maximum packet size supported by the interface type. These limits may be referred to as the "maximum transfer unit" (MTU) of the interface. For example, standard Ethernet has an MTU of about 1500 bytes, while other interface types may have, for example, MTUs around 9000 bytes. If the size of a packet exceeds the size of the MTU of its destination interface, the packet may be fragmented (i.e., broken up into two or more pieces) so that it may be transmitted over the interface. Internet protocols (e.g., IPv4) may define protocols for handling fragmentation.

Figure 15:
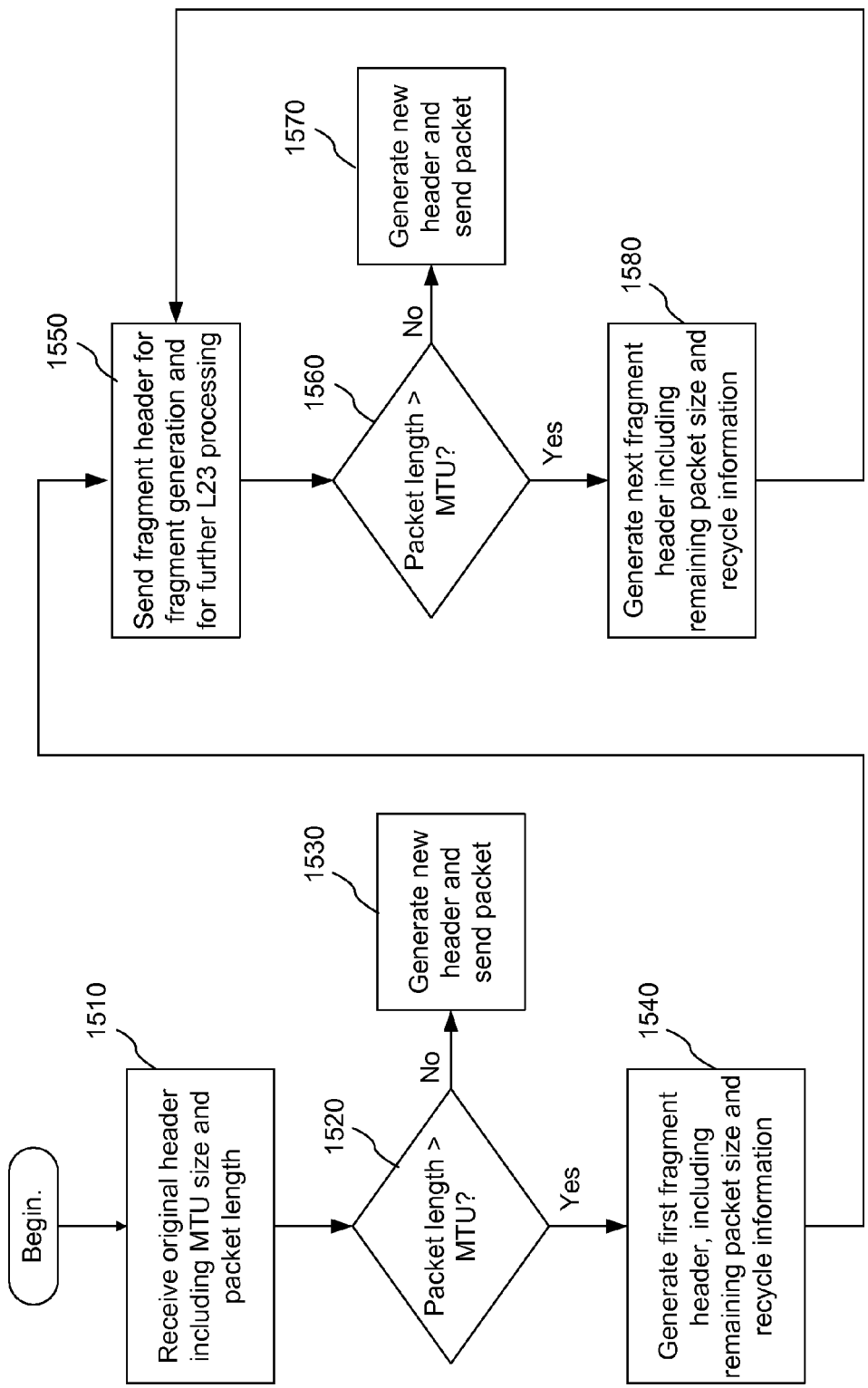
FIG. 15 is a flow chart illustrating fragment handling by the L2/L3 engine component of FIG. 5.

FIG. 15 is a flow chart illustrating fragment handling by the L2/L3 engine component 504. L2/L3 engine component 504 may receive the first two cells of a packet, which contain the packet header information, from descriptor reader 503 [act 1510]. The header information may include the length of the packet. Alternately, the packet length may be detected from the packet itself. The header information may also be used to obtain the MTU size of the interface that is the packet's destination. For example, the header information may be used to construct a key, which may be used to look up MTU information from SRAM 510. L2/L3 engine component 504 may determine whether the length of the packet associated with the header information exceeds the MTU size of the destination interface [act 1520].

If the length of the packet is less than the MTU size of the destination interface, L2/L3 engine component 504 may generate a new header for the packet, and may transmit the new header to output interface component 505 [act 1530]. Output interface component 505 may assemble the new header information and packet data from buffer 502 into a packet.

If the length of the packet is greater than the MTU size of the destination interface, L2/L3 engine component 504 may generate a first fragment header and send a first fragment with the header [act 1540]. The first fragment header may include the size of any payload data in the first two cells and the size of the packet data to be read from buffer 502. This size information may be used to calculate an updated packet length. The updated packet length may be calculated by L2/L3 engine component 504 and included in the first fragment header. Alternately, the updated packet length may not be included in the first fragment header, but may be calculated from information in the first fragment header in later processing (e.g., act 1560). The first fragment header also may include recycle information, such as a bit indicating previous fragmentation and a length of the L2 header.

The first fragment header may be transmitted to output interface component 505 for generation of a first packet fragment, and may also be transmitted to input interface component 501 [act 1550]. Output interface component 505 may assemble the first fragment header information and packet data from buffer 502 into a first packet. Meanwhile, input interface component may send the first fragment header, via the descriptor reader 530, to L2/L3 engine component 504.

L2/L3 engine component 504 may use the first fragment header to generate one or more subsequent fragment headers by determining whether the updated packet length (either contained in the first fragment header or calculated) exceeds the MTU size of the destination interface [act 1560]. If the updated packet length is less than the MTU size of the destination interface, L2/L3 engine component 504 may generate a new header for the packet, and may transmit the new header to output interface component 505 [act 1570]. Output interface component 505 may assemble the new header information and packet data from buffer 502 into a second packet fragment.

If the updated packet length is greater than the MTU size of the destination interface, L2/L3 engine component 504 may generate a next fragment header [act 1580]. The next fragment header may include the size of the packet data to be read from buffer 502. This size information may be used to calculate an updated packet length. The updated packet length may be calculated by L2/L3 engine component 504 and included in the first fragment header. Alternately, the updated packet length may not be included in the next fragment header, but may be calculated from information in the first fragment header in later processing (e.g., act 1560). The next fragment header also may include recycle information, such as a bit indicating previous fragmentation and a length of the L2 header.

The next fragment header (and any subsequent fragment headers) may be transmitted to output interface component 505 and input interface component 501, and may be processed as described in acts 1550-1580. In this manner, L2/L3 engine component 504 may recycle packet headers when the packet's destination interface requires that the packet be fragmented.

Summary

As described above, an L2/L3 engine includes separate L2 and L3 execution units that execute in parallel and simultaneously with one another. The L2 and L3 execution units may communicate with one another through a set of predefined mailbox registers. Header data generated by the L2 and L3 execution units are independently written to buffers. When each execution unit finishes generating its header data for the packet, the final packet header, including the L2 and L3 information, is built. In this manner, a parallel, efficient L2/L3 generation engine is achieved.

The foregoing description of preferred embodiments of the invention provides illustration and description, but is not intended to be exhaustive or to limit the invention to the precise form disclosed. Modifications and variations are possible in light of the above teachings or may be acquired from practice of the invention. Moreover, while a series of acts has been presented with respect to FIGS. 8 and 15, the order of the acts may be different in other implementations consistent with principles of the invention. Additionally, lines with arrows are used in the figures to generally illustrate the flow of data. In practice, embodiments consistent with the principles of the invention may send data on these lines in both directions.

PFEs 110 may be implemented in hardware, software, or some combination thereof. For example, various portions of PFEs 110 may be implemented in application-specific integrated circuits (ASICs). The ASICs may be configured to perform some processing via dedicated logic, and may also be configured to perform some processing using microcode instructions that may be stored in memory. Those skilled in the router art will appreciate that the invention described herein might be practiced using a variety of hardware configurations in addition to, or instead of, ASICs. For example, some combination of general purpose processors, digital signal processors (DSPs), and programmable gate arrays (PGAs) may also be utilized to implement the functionality described herein.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A header processing engine for network packets comprising:
   an input memory to store incoming header information of a packet;
   a processing unit to generate header information for the packet by operating on the header information stored in the input memory, the processing unit including a first processing component to generate layer 2 (L2) header information for the packet and a second processing component implemented in parallel with the first processing component and to generate layer 3 (L3) header information for the packet;
   an instruction memory operatively coupled to the first processing component, the instruction memory to provide the first processing component with programming instructions relating to the processing of the L2 header information; and a second instruction memory operatively coupled to the second processing component, the second instruction memory to provide the second processing component with programming instructions relating to the processing of the L3 header information, where the second processing component includes a plurality of execution sections implemented in parallel with one another, each of the plurality of execution sections operating based on a portion of each instruction from the second instruction memory.

2. The header processing engine of claim 1, further comprising:
a build component to receive the generated header information while the input memory stores incoming header information for a next packet.

3. The header processing engine of claim 2, further comprising:
a first output buffer to receive the L2 header information generated by the first processing component; and
a second output buffer to receive the L3 header information generated by the second processing component.

4. The header processing engine of claim 2, where the build component forms a combined header for the packet from the L2 header information and the L3 header information.

5. The header processing engine of claim 1, further comprising:
registers connected to the first processing component and the second processing component.

6. A method comprising:
receiving via a router device, header information for a packet;
determining via the router device, descriptor information relating to the received header data;
generating, by a first processing unit associated with the router device, layer 2 (L2) protocol information for the packet based on the received header information and the descriptor information and simultaneously generating, by a second processing unit associated with the router device, layer 3 (L3) protocol information for the packet based on the received header information and the descriptor information;
receiving, via the router device, the L2 and L3 protocol information while receiving header information for a next packet;
writing, via the router device, the generated L2 protocol information for the packet to a first buffer as the L2 protocol information is generated; and
writing, via the router device, the generated L3 protocol information for the packet to a second buffer as the L3 protocol information is generated.

7. The method of claim 6, where receiving the L2 and L3 protocol information is performed when the generation of the L2 and L3 protocol information for the packet is complete.

8. The method of claim 6, further comprising:
building a new header for the packet based on the L2 and L3 protocol information.

9. The method of claim 8, further comprising:
combining the new header with payload information of the packet to form a complete packet.

10. A network device for processing packets comprising:
a buffer to store the packets, including header data and payload data for the packets;
a descriptor reader component coupled to the buffer, the descriptor reader component to receive the header data for the packets stored in the buffer and look up descriptor information relating to the received header data;
a header processing component to receive the header data and the descriptor information, the header processing component including a first processing component to generate, based on the header data and the descriptor information, layer 2 (L2) header data for the packet and a second processing component implemented in parallel with the first processing component and to generate, based on the header data and the descriptor information, layer 3 (L3) header data for the packet;
a first output buffer to receive the L2 header data generated by the first processing component; and
a second output buffer to receive the L3 header data generated by the second processing component.

11. The network device of claim 10, where the first processing component is implemented in parallel with the second processing component.

12. The network device of claim 10, where the descriptor reader component looks up the descriptor information in external random access memory.

13. The network device of claim 10, where the network device is a router.

14. The network device of claim 10, further comprising:
a build component to receive the generated L2 and L3 header data while the header processing component stores incoming header information for a next packet.

15. The network device of claim 14, where the build component combines the generated L2 and L3 header data to form a combined header.

16. The network device of claim 14, where the build component combines the generated header information after the first processing unit and the second processing unit have completed generation of the L2 header data and the L3 header data, respectively.

17. The network device of claim 10, where the header processing component additionally includes:
an instruction memory operatively coupled to the second processing component, the instruction memory to provide the second processing component with programming instructions relating to the processing of the L3 header information.

* * * * *

UNITED STATES PATENT AND TRADEMARK OFFICE
CERTIFICATE OF CORRECTION

PATENT NO. : 7,680,116 B1
APPLICATION NO. : 11/691972
DATED : March 16, 2010
INVENTOR(S) : Raymond M. Lim et al.

Page 1 of 1

It is certified that error appears in the above-identified patent and that said Letters Patent is hereby corrected as shown below:

Column 15,
Claim 6, line 33, after the word "receiving" insert a --,--
Claim 6, line 35, after the word "determining" insert a --,--

Signed and Sealed this

Eleventh Day of May, 2010

David J. Kappos
*Director of the United States Patent and Trademark Office*